United States Patent
Behl et al.

(10) Patent No.: US 10,956,142 B2
(45) Date of Patent: *Mar. 23, 2021

(54) DISTRIBUTING A COMPOSITE APPLICATION

(71) Applicant: International Business Machines Corporation, Armonk, NY (US)

(72) Inventors: Stefan Behl, Holzgerlingen (DE); Uwe Hansmann, Tuebingen (DE); Timo Kussmaul, Boeblingen (DE); Thomas Steinheber, Stuttgart (DE); Thomas Stober, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/009,436

(22) Filed: Jun. 15, 2018

(65) Prior Publication Data

US 2018/0293060 A1 Oct. 11, 2018

Related U.S. Application Data

(63) Continuation of application No. 15/479,375, filed on Apr. 5, 2017, now Pat. No. 10,025,579.

(51) Int. Cl.
*G06F 8/61* (2018.01)
*G06F 9/445* (2018.01)
(Continued)

(52) U.S. Cl.
CPC ............ *G06F 8/64* (2013.01); *G06F 8/31* (2013.01); *G06F 8/60* (2013.01); *G06F 8/61* (2013.01);
(Continued)

(58) Field of Classification Search
CPC ...... G06F 8/60; G06F 8/64; G06F 8/61; G06F 8/31; G06F 8/65; G06F 9/44505; G06F 9/541; H04L 67/34; H04L 69/24
See application file for complete search history.

(56) References Cited

U.S. PATENT DOCUMENTS 6,061,643 A * 5/2000 Walker ............... G06F 11/3688 702/123
6,775,824 B1 * 8/2004 Osborne, II ........ G06F 11/3664 714/46

(Continued)

OTHER PUBLICATIONS

Eilam et al., Pattern-based Composite Application Deployment, 12th IFIP/IEEE International Symposium on Integrated Network Management 2011, 978-1-4244-9221-31111$26.00 © 2011 IEEE, pp. 117-224.

(Continued)

*Primary Examiner* — Phillip H Nguyen
(74) *Attorney, Agent, or Firm* — Schmeiser, Olsen & Watts, LLP; Michael A. Petrocelli

(57) ABSTRACT

A method, computer system, and computer program product for distributing a composite application is provided. The composite application includes several components, and is adapted to be distributed on multiple systems implementing runtime environments. The components have associated distribution descriptors. The distribution descriptors specify requirements for the at least one target runtime environment. The method includes selecting a composite application from a code asset repository and upon the selection of the composite application, creating a distributing workflow by a distributing unit. The distributing workflow includes a configuration. The configuration specifies the at least one target runtime environment. The method further includes executing the distributing workflow. The executing can include evaluating the distribution descriptor of each component (Continued)

according to the configuration, based on the evaluating, creating a distribution script for each component, and executing the distribution scripts.

19 Claims, 9 Drawing Sheets

(51) Int. Cl.
| | | |
|---|---|---|
| G06F 9/54 | (2006.01) | |
| G06F 11/36 | (2006.01) | |
| G06F 8/60 | (2018.01) | |
| G06F 8/65 | (2018.01) | |
| H04L 29/08 | (2006.01) | |
| H04L 29/06 | (2006.01) | |
| G06F 8/30 | (2018.01) | |

(52) U.S. Cl.
CPC ............ *G06F 8/65* (2013.01); *G06F 9/44505* (2013.01); *G06F 9/541* (2013.01); *G06F 11/3688* (2013.01); *H04L 67/34* (2013.01); *H04L 69/24* (2013.01); *H04L 67/10* (2013.01)

(56) References Cited

U.S. PATENT DOCUMENTS

| | | |
|---|---|---|
| 6,986,135 B2 | 1/2006 | Leathers et al. |
| 7,685,596 B1 * | 3/2010 | Webb ................... G06F 8/61 717/177 |
| 7,770,151 B2 | 8/2010 | Sanjar et al. |
| 8,150,948 B2 | 4/2012 | Andrews et al. |
| 8,291,378 B2 | 10/2012 | Arnold et al. |
| 8,332,459 B2 | 12/2012 | Blum et al. |
| 8,595,693 B2 | 11/2013 | Berg et al. |
| 8,762,937 B2 | 6/2014 | Berg et al. |
| 8,904,368 B2 * | 12/2014 | Haenel .................. G06F 8/61 717/147 |
| 9,032,312 B2 | 5/2015 | Barnes et al. |
| 9,286,037 B2 | 3/2016 | Winkler et al. |
| 9,336,060 B2 | 5/2016 | Nori et al. |
| 2006/0069717 A1 * | 3/2006 | Mamou ............... G06F 16/254 709/203 |
| 2007/0078988 A1 * | 4/2007 | Miloushev ........... G06F 9/485 709/227 |
| 2008/0098099 A1 | 4/2008 | Khasnis et al. |
| 2009/0007067 A1 | 1/2009 | Hepper et al. |
| 2010/0042986 A1 * | 2/2010 | Greiner ................ G06F 8/61 717/174 |
| 2011/0029967 A1 | 2/2011 | Berg et al. |
| 2012/0042383 A1 * | 2/2012 | Greene ................. G06F 21/57 726/25 |
| 2012/0260245 A1 | 10/2012 | Berg et al. |
| 2013/0326498 A1 * | 12/2013 | Levy .................... G06F 8/31 717/177 |
| 2014/0136710 A1 * | 5/2014 | Benari ................. G06F 9/5061 709/226 |
| 2014/0136711 A1 * | 5/2014 | Benari ................. G06F 9/5061 709/226 |
| 2014/0282394 A1 * | 9/2014 | Karimisetty ........... G06F 8/30 717/120 |
| 2016/0105493 A1 * | 4/2016 | Bacher ................ G06F 8/60 709/217 |
| 2016/0306735 A1 * | 10/2016 | Adderly ............. G06F 11/3664 |
| 2016/0321051 A1 * | 11/2016 | Austel ................. H04L 67/025 |

OTHER PUBLICATIONS ibm.com/redbooks, Building Composite Applications, Jul. 2007, Retrieved from Internet: URL: http://www.redbooks.ibm.com/redbooks/pdfs/sg247367.pdf, 758 pages.
Notice of Allowance (dated Apr. 5, 2017) for U.S. Appl. No. 15/479,375, filed Apr. 5, 2017.

* cited by examiner

US 10,956,142 B2

DISTRIBUTING A COMPOSITE APPLICATION

This application is a continuation application claiming priority to Ser. No. 15/479,375, filed Apr. 5, 2017, now U.S. Pat. No. 10,025,579 issued Jul. 17, 2018.

TECHNICAL FIELD

The present invention relates to distributing a composite application and more specifically, to automatically distributing a composite application onto different target runtime environments.

BACKGROUND

Many modern applications are composite applications. A composite application is any application comprising at least two components, wherein the components may be applications themselves. Each component is able to perform an action, to execute a task, to calculate a result of a given function, process data, or anything alike. All components combined are able to solve a data processing problem assigned by a user. Depending on the framework requirements of the application and the needs of the user, the composite application may comprise a set of components specifically chosen for the composite application.

SUMMARY

In one aspect, the invention relates to a method, computer system, and computer program product for distributing a composite application, the composite application comprising several components, the composite application being adapted to be distributed on multiple systems implementing runtime environments, the runtime environments comprising at least one target runtime environment, the components having associated distribution descriptors, the distribution descriptors specifying requirements for the at least one target runtime environment. A processor of a computing system selects the composite application from a code asset repository. Upon the selection of the composite application, a distributing workflow is created by a distributing unit, the distributing workflow comprising a configuration, the configuration specifying the at least one target runtime environment and capabilities of the at least one target runtime environment. The distributing workflow is executed, including evaluating the distribution descriptor of each component according to the configuration, based on the evaluating, creating a distribution script for each component, and executing the distribution script, resulting in a triggering of a distribution of the plurality of components on at least one of the multiple systems implementing the at least one target runtime environment.

DETAILED DESCRIPTION

Figure 1A:
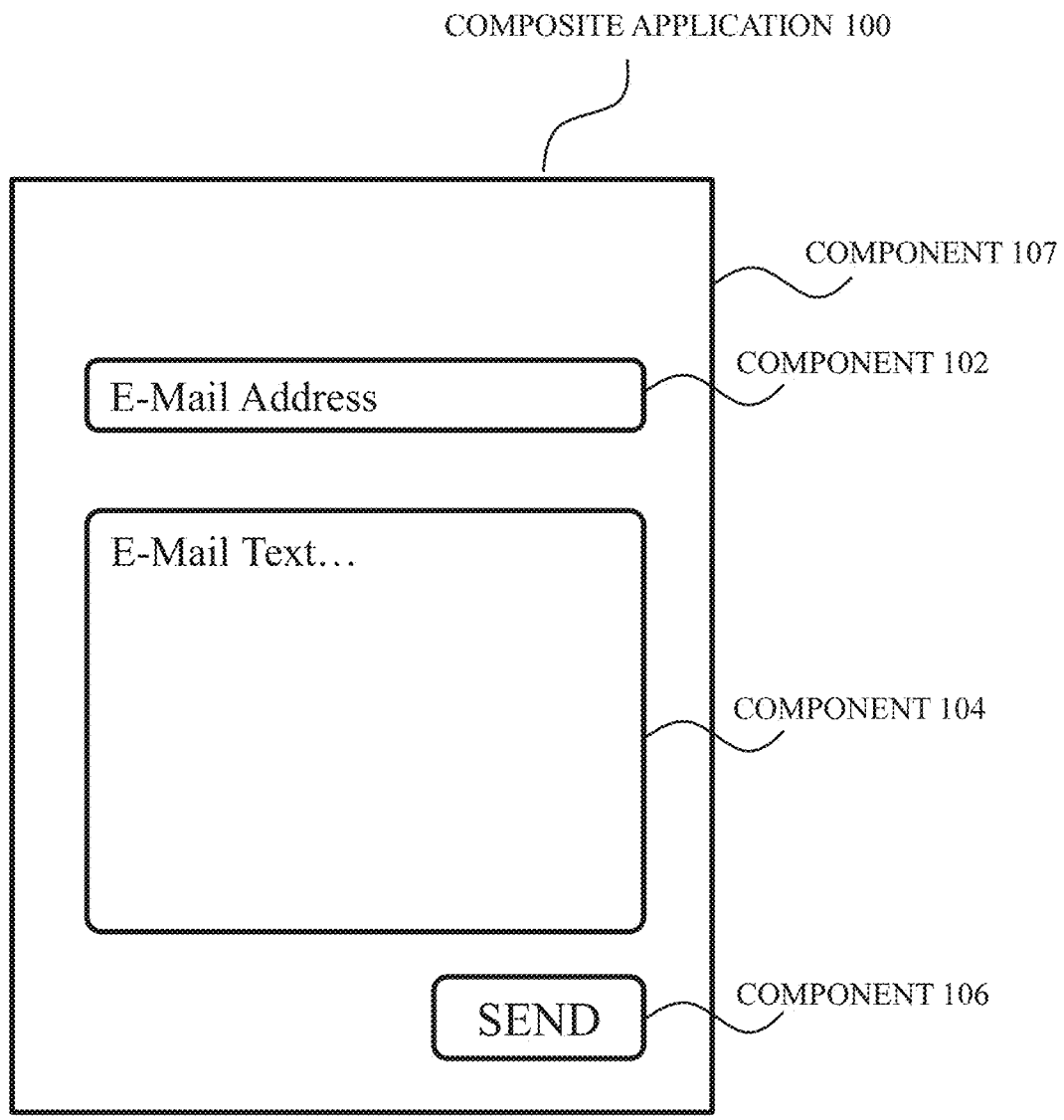
FIG. 1a depicts a graphical user interface of a composite application, in accordance with embodiments of the present invention.

A function of the components of a composite application may be very different. One component may be a widget for showing a set of numbers, such as the actual date or current time, another component may comprise a business logic such as the checkout from an online store including the logic for online payment and the triggering of another component, which processes a logistic unit for shipping the product just bought.

The components, or the comprised logic within, may be differently complex depending on a function of the components or the comprised logic within. The distribution of a composite application may therefore comprise a deployment of complex components or back-end objects, which is performed onto a dedicated server. The deployment may comprise a security procedure like the exchange of certificates, an encryption procedure, a temporary shutdown of the target system or a combination of all of these procedures. The deployment further comprises an evaluation of meta-data, which has to be arranged for requirements of the component and capabilities of a target runtime environment. In this context, meta-data refers to information that describes the information about the component and can be used to affect a behavior, function, interaction with another component, depiction, positioning, and the like, of a component. The capabilities of the runtime environment are a communicable, unforgeable token of authority, which refer to a value that references an object, e.g. an object of an executed component, along with a set of access rights.

Less complex components, such as widgets or front-end objects for displaying information, do not need to be deployed. The less complex components may be simply published by putting the corresponding meta-data in a pre-compiled form into the corresponding directory. Both processes of deploying and publishing are herein referred to as distributing.

The front-end object and the back-end object are compatible to each other. Usually designed and constructed by different kinds of programmers, the challenge for distributing composite applications is creating interfaces for front-end objects and back-end objects to work together without producing any error. The front-end objects are designed to interact with the user, while the back-end objects are designed to process the data provided by the user.

The creation and distribution of a composite application is laborious and difficult if the different components are supposed to be executed by different target systems, and even more difficult if the components are to be executed within different runtime environments or if the different components are based on different coding languages.

Embodiments of the present invention may allow an automated creation and execution of a distributing workflow for an automated distribution of a composite application. The distributing workflow may comprise a configuration, which specifies a target environment and capabilities of the target runtime environment. A capability is a communicable, unforgeable token of authority, which refers to a value that references an object (e.g. an object of an executed component) along with an associated set of access rights. An application on a capability-based operating system uses a capability to access an object.

The automated creation and execution of the distributing workflow may have the beneficial effect that a user, who wants to use an application specialized and optimized for individual services, may just have to select the desired composite application from a code asset repository. The workflow for distributing the composite application over the users system may then be created and executed automatically. The user does not need to intervene after the selection of the composite application.

Embodiments of the present invention may further allow a distribution of a composite application on different systems and runtime environments. The requirements of each component are contained within the component's distribution descriptor. The distribution descriptors may specify how the components need to be distributed to provide the composite application on the target system. The distribution descriptor may comprise meta-data specifying the corresponding component, how the corresponding component is used, how the corresponding component communicates with other components, if and how the corresponding component is displayed or represented in a graphical user interface. Some of the information contained within the descriptors may be variable for adaptation according to the configuration, or the target runtime environment respectively. The descriptors may be implemented as XML files.

The automatically executed distributing workflow evaluates the distribution descriptors of the components according to the configuration, which is contained by the distributing workflow, specifying the target runtime environment. Distribution scripts, which trigger the distribution of each component individually, are created from the information comprised by the distribution descriptors and the configuration. The distribution descriptors comprise information about the components and the configuration comprises information about the target runtime environment. Therefore, the distribution scripts comprise the instructions for distributing the components in the target runtime environment, and the distribution of composite applications on different target systems and runtime environments may be achieved.

According to exemplary embodiments, the distribution descriptor further specifies an application programming interface of the associated component, the application programming interface specifying a communication capability of the component with another one of the components.

The communication capability of the component with another one of the components may have the beneficial effect that the distribution process is more flexible with relation to front-end objects, which may be usually published, and back-end objects, which may be deployed. According to the API, or the communication the API specifies, respectively, the component may be recognized as a front-end object or a back-end object. The corresponding processes may be initiated based on the recognition, and the distribution process may be optimized. The necessary information of how to distribute the component is comprised by the distribution descriptor and may further enable an interchangeability of the front-end objects and the back-end objects, because the corresponding processes are initiated according to the instructions comprised by the distribution descriptor of each component individually and not by the distribution process of the composite application in general. By performing the distribution process according to the components, the distributing workflow may not need to schedule the distribution process of each component individually. The distributing workflow merely executes the distribution scripts, which trigger the corresponding distribution process. Thus, for the distributing workflow, it is not necessary to comprise information about the corresponding distribution process of a component, but the whole composite application.

According to exemplary embodiments, the distribution descriptor further specifies an application programming interface of the associated component, the application programming interface further specifying a communication capability of the component with a system that the target runtime environment is implemented on.

The communication capability of the component with the system may allow a communication between the system hosting the runtime environment and a component of the composite application. If the runtime environment crashes or registers some kind of error, which may or may not be resolved, the component executed within the runtime environment may be halted, restarted or resumed. If the error can be resolved, the execution of the component may be halted until the error is resolved, and then be resumed. If the error persists and cannot be resolved, the target runtime environment may restart the component or itself to ensure a performance without errors. To communicate the existence of an error and corresponding instructions for the component to the component or the composite application in general, an API for communication between the system and the executed component can be used.

According to exemplary embodiments, the distribution descriptor further specifies an application programming interface of the associated component, the application programming interface further specifying a communication capability of the component with a user using the composite application.

According to exemplary embodiments, the components are distributed over at least two systems of the multiple systems, the systems being comprised in a system topology, which may allow the execution of the components on separated systems. Even though, the components may be distributed over a single system as covered above, one component may be executed on a first system; a second component may be executed on a second system. The first system and the second system may be connected with each other via a network. The first system may execute a component that requires a high security level (e.g. a data base containing private customer data). The second system may execute a web application for employees to access the database from beyond the owning company's borders (e.g. from a home office or when attending a conference, by using the composite application). Such scenario may be achieved by distributing the composite application on a system topology (e.g. a hybrid cloud).

In this context, a hybrid cloud is a system topology combining features of a public cloud and a private cloud. By distributing the components over systems in a system topology, the services may be offered as a composite application and not as two separated applications, for which the connection process between the applications may be difficult, laborious or expensive.

Distributing a component over two identical systems within a system topology may have the beneficial effect of an increased availability, reliability, and serviceability. The components may schedule the workload according to the processor load of each system. The workload may be distributed to the systems to optimize the efficiency of the processing by utilizing the available resources efficiently. In another scenario, the second system may be a backup system, which executes a component if the first system fails.

According to exemplary embodiments, each runtime environment executing one of the components, which may allow an increased reliability and an increased availability by executing every component independently from the other ones. In this case, independent can be understood as independent with respect to the execution.

According to exemplary embodiments, the method further comprises testing of the composite application upon deploying the components, the testing generating a testing result, creating of a second distributing workflow by the distributing unit, the second distributing workflow comprising the configuration, the configuration modified according to the testing result, and executing the second distributing workflow.

Testing the composite application upon deploying the components may allow a staged distribution of the composite application. Depending on the specific problem to be solved by the composite application, it may be required to redistribute the composite application. The first time the composite application is distributed the components may be tested for correct function and for correct communication among each other. Any deviation from the expected functionality may be registered by generating a testing result, which may further have the beneficial effect of the testing results being able to be examined by a user or a developer developing and testing the composite application. A developer might notice incompletely or falsely distributed components, and prevent problems associated therewith during further development processes.

The configuration of a second distributing workflow is modified according to the testing result of the first distribution process, which may have the beneficial effect of preventing the occurred problems during a second distribution process. The components may be distributed a second time in an optimized manner regarding the failure, and the composite application may be distributed with a minimized likelihood of failing during execution. The multiple distribution of the components and therefore of the composite application can be referred to as staged distribution. The staged distribution may increase the reliability and the availability of the composite application and the components of the composite application.

According to exemplary embodiments, the testing may comprise generating artificial input for each component, processing of the artificial input by the components and comparing an output from each component with a nominal value, the comparing generating the testing result.

Testing the composite application may have the beneficial effect that each component may be tested individually, which improves the likelihood of finding an error if an error exists. During the testing of a component, virtual implementations of other components may be used to simulate the processing of data input and data output of the component. The virtual implementations may be fed with artificial or simulated input and may transfer output of the virtual implementations to the component to be tested. The output of the tested component may be transferred to the virtual counterpart of the corresponding component or components within a processing data pipeline. If the output generated by the tested component correlates with a nominal value, no error is detected. The tested component may also be the last component within the processing data pipeline. Then, the output of the component itself is compared to the nominal value. By testing each component individually, the testing result may indicate which component produced the error or an incorrect output.

According to exemplary embodiments, the distribution scripts comprise distribution instructions for the components, the distribution instructions being assembled from a distribution script repository and adapted for the configuration.

Distribution scripts comprising distribution instructions for the components may permit a developer developing the composite application or a component to predefine the instructions for the multiple systems, and a number of runtime environments. The predefined distribution instructions may be provided via a distribution script repository, containing all available distribution instructions for the components, similar to a library. By assembling the distribution instructions from the distribution script repository, the distribution of the composite application may be simplified, because the distributing workflow creating the distribution scripts may extract the corresponding distribution instructions from the distribution script repository according to the corresponding distribution descriptor, adapt the instructions according to the configuration of the distributing workflow, and summarize the instructions as a distribution script.

According to exemplary embodiments, the components are based on different coding languages, which may allow an increased flexibility for the developer and the provider of composite applications and components. Coding languages come with advantages and disadvantages depending on the application to develop and the function the application is supposed to fulfill. By using components based on various coding languages, the composite application may comprise components written in a coding language, which suits the function of a component the best. Thus, using different coding languages for the components may utilize the advantage of each individual coding language for the individual function or may enable the usage of the coding language preferred by the developer. Both aspects may increase the freedom for and the effectivity of developing a composite application.

According to exemplary embodiments, the coding languages are Java, Java Script, Node.js, Scala, Haskell, C++, C, C#, Ruby, Python, Pascal, Visual Basic, UNITY, Node.js. These various coding languages may allow the developer of the composite application or a component to choose from the most common coding languages to program composite applications. The list of coding languages is not limited to the named coding languages, but may contain any coding language.

According to exemplary embodiments, the distribution of the components may comprise a publishing of one of the components in case one of the components comprises a front-end object, which may allow a simplification of the distribution process by publishing the front-end object.

According to exemplary embodiments, the distribution of the components may comprise a deploying of one of the components in case one of the component comprises a back-end object, which may allow an increased security level for the process of the distribution of the composite application. In contrast to publishing front-end objects with low complexity, the back-end objects may be much more complex. An example back-end object may be the logic behind an online shopping application triggering the logistics of a warehouse. Such a back-end object may need to interact with a machine, a logistic unit or a system outside the composite application. Therefore, the error tolerance of such a back-end object may be minimal or even not existing. To ensure an accurate distribution of a back-end object the component is deployed onto the system, wherein the deploying comprises an installation of the component.

According to embodiments, the composite application is selected by a user.

FIG. 1a depicts a graphical user interface of an exemplary composite application 100, in accordance with embodiments of the present invention. For instance the exemplary composite application 100 may be designed as an application for sending e-mails. In this example, the graphical user interface comprises the components 102, 104, 106, 107. The component 102 is a field for entering an e-mail address of a receiver. The component 104 is formed as field for entering text, which will be the message of the e-mail. The component 106 represents a sending button which starts the transmitting of the e-mail. Furthermore, the components 102, 104, 106 are embedded within another component 107, which is the frame of the shown window. While the components 102, 104, 106 are formed to receive input from a user and process the input, the component 107 is formed to arrange the graphical user interface clearly. The components 102, 104, 106, 107 are designed as front-end objects or widgets. The components 102, 104, 106 comprise instructions for sending data to a back-end object. The components 102, 104, 106, 107 may further comprise instructions for displaying the widgets like size, position, color and so on.

Figure 1B:
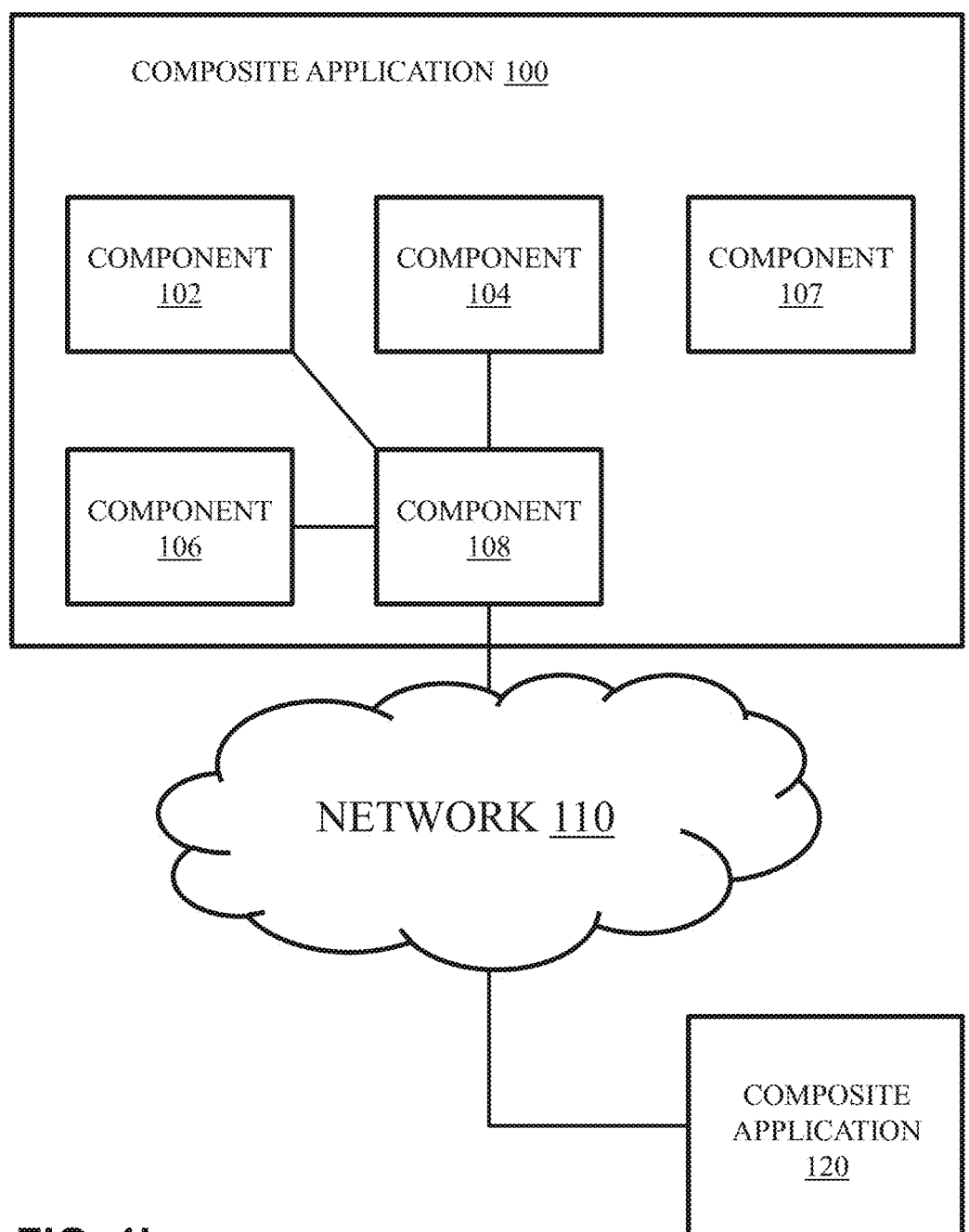
FIG. 1b depicts a background of the composite application of FIG. 1a, in accordance with embodiments of the present invention.

FIG. 1b depicts a background of the composite application 100, in accordance with embodiments of the present invention. In total, the composite application 100 comprises the components 102, 104, 106, 107, 108. The component 108 is formed as back-end object and does not have a representation within the graphical user interface. The component 108 is nevertheless a part of the composite application 100, because the component 108 provides the service of sending the entered text to the entered e-mail address after the sending button is pressed. The logic of component 108 is connected with the components 102, 104, 106. After pressing the sending button, component 108 starts the sending process. Therefore, the component 108 may be loaded and executed by the runtime environment of the operating system or component 108 may change from an idle state to an active state.

For receiving the data from the components 102, 104, 106 and sending the e-mail, component 108 comprises instructions for processing text messages and utilizing corresponding transfer protocols like TCP/IP or the like.

The component 108 receives the message entered in the text field from component 104 and the entered e-mail address from component 102. The message is sent via a network 110 and received by a receiver running a second composite application 120, which is configured to receive e-mails and display the messages contained within. The network 110 may comprise an internet, an intranet or a local area network. After the message is send, component 108 is no longer executed or returns to the idle state. The composite application 100 is now ready to send another message.

Within this example, the graphical user interface of the composite application 100 is displayed to the user all the time. The component 107, the frame of the window, is operated independently from the components 102, 104, 106, 108 and therefore it does not need any connection with the other components. The graphical user interface may be configured to respond to a return value of component 108, which may comprise a sending confirmation or an error message. Then the components 102, 104, 106, 107 comprise the instructions for executing the corresponding reaction. In this case, component 107 may be connected to component 108 as well.

Figure 2:
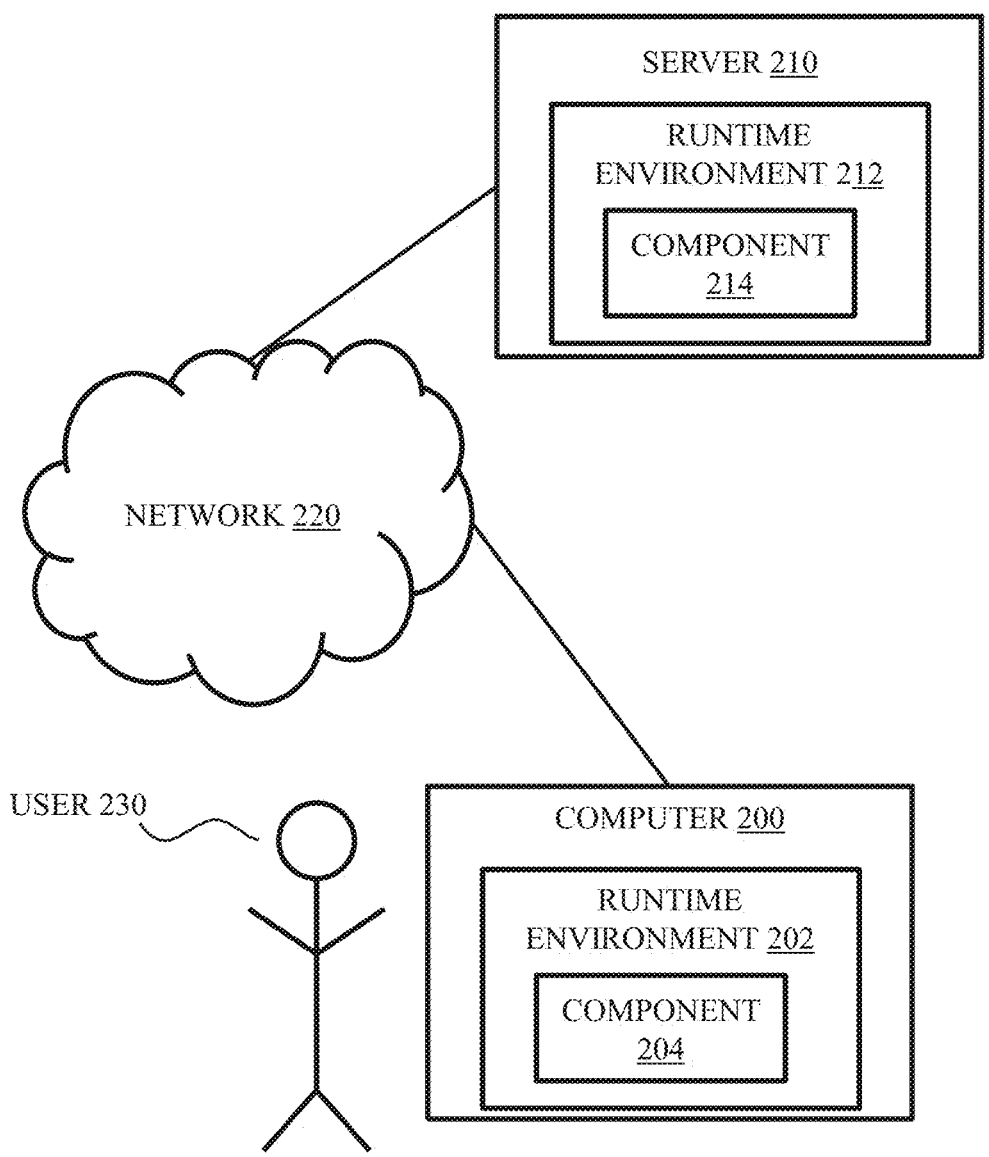
FIG. 2 depicts a composite application distributed to a server and a personal computer, in accordance with embodiments of the present invention.

FIG. 2 depicts the composite application 100 of FIG. 1a and FIG. 1b, which is distributed to a server and a personal computer, in accordance with embodiments of the present invention. The exemplary composite application 100 of FIG. 1a and FIG. 1b comprises the components 204, 214 and is distributed to a computer 200 and a server 210. The computer 200 and the server 210 are connected with each other via a network 220. The network may be any connection between two or more systems like the internet, an intranet, a cable connection or a wireless connection. The computer 200 implements a runtime environment 202 and the server implements a runtime environment 212. The runtime environments 202, 212 may be similar runtime environments or different runtime environments. The runtime environments may comprise JavaScript, Node, Scala, Java or any other runtime environment suitable.

A user 230 interacts with the composite application 100 of FIG. 1a and FIG. 1b via the computer 200. The runtime environment 202 executes the component 204, which comprises any user interface for interaction and instructions for communicating with component 214. Component 214 is executed by runtime 212 at the server 210. Component 214 comprises instructions for communicating with component 204 and instructions for processing the data received from component 202.

The components 204, 214 may each further comprise instructions for a scenario in which the other system, the other component respectively, is not responding. These instructions may comprise the display of an error message or the triggering of an idle process.

Figure 3A:
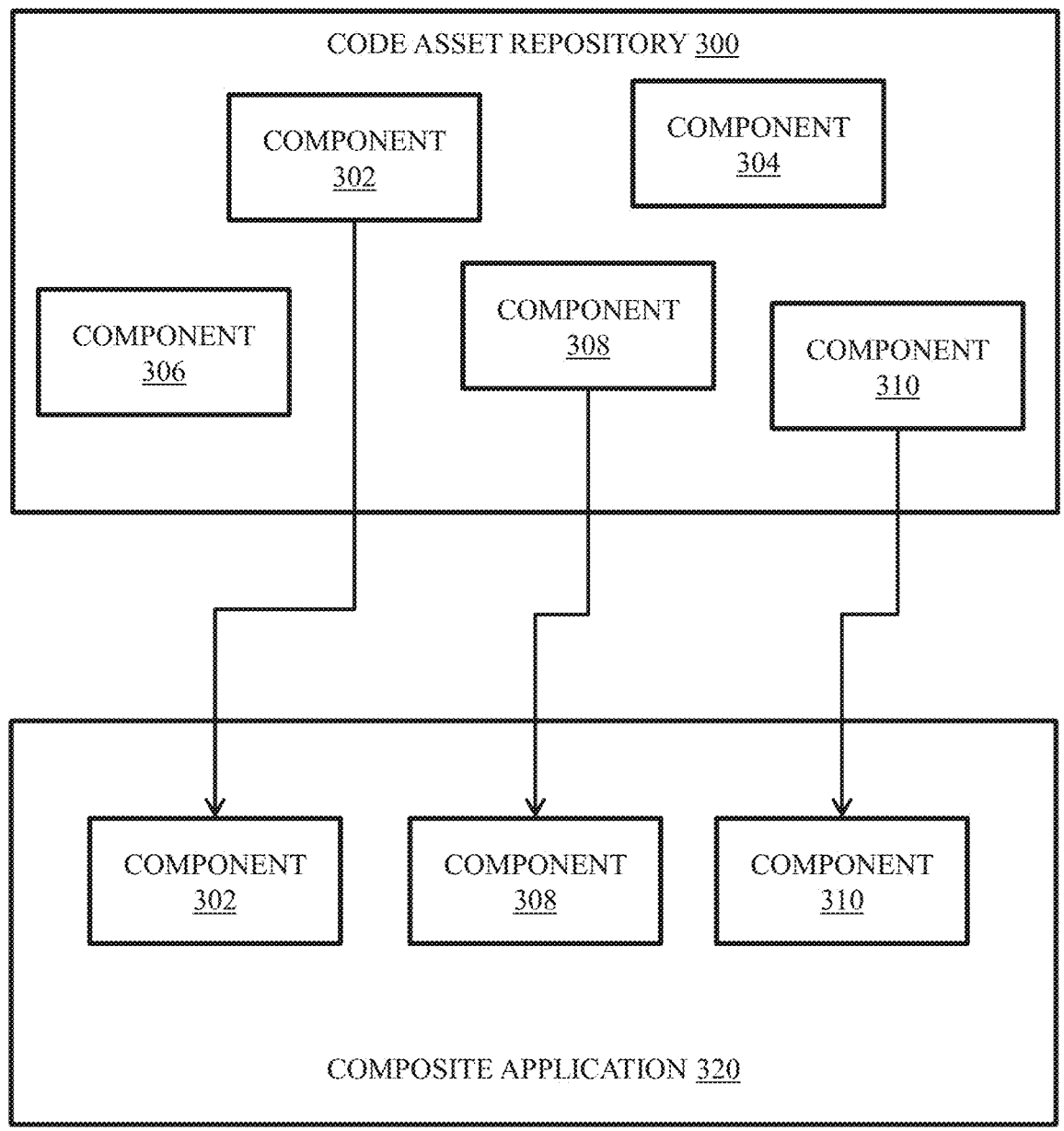
FIG. 3a depicts an assembling of a composite application for a specific runtime environment, in accordance with embodiments of the present invention.

FIG. 3a depicts an assembling of a composite application 320 for a specific runtime environment, in accordance with embodiments of the present invention. The composite application 320 comprises several components, which are contained within a code asset repository 300. The code asset repository may comprise an app store, a library, a zip file, an ISO file or any form of data storage suitable for a number of code files, which form the components. The code asset repository 300 may comprise the components 302, 304, 306, 308, 310. Other code asset repositories may comprise more or less components and therefore more or less composite applications to compose with the components. However, in this example, the composite application 320 is selected, which comprises the components 302, 308, 310.

Figure 3B:
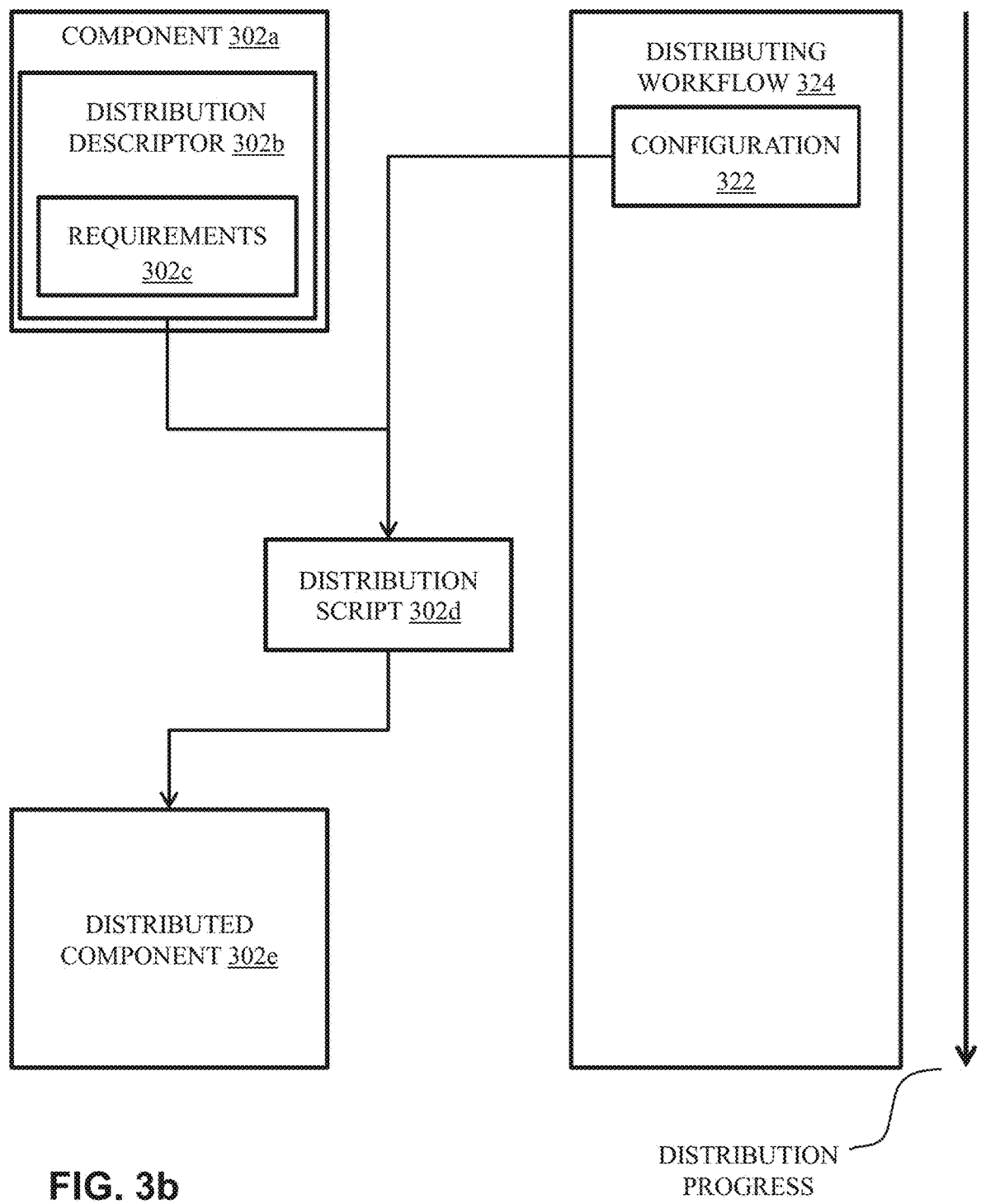
FIG. 3b depicts another assembling of the composite application of FIG. 3a for a specific runtime environment, in accordance with embodiments of the present invention.

FIG. 3b depicts another assembling of the composite application 320 of FIG. 3a for a specific runtime environment, in accordance with embodiments of the present invention. A distributing unit, which may comprise any framework for distributing composite applications, creates a distributing workflow 324. The distributing workflow 324 comprises instructions, which are executed one after another, for assembling the composite application 320. The instructions comprise instructions for assembling all components 302, 308, 310 of the composite application 320. The distributing workflow further comprises a configuration 322, which specifies the runtime environment with all the parameters. The parameters may comprise available capabilities, version, supported protocols, drivers and so forth.

The distributing workflow 324 is executed upon creation. The execution of the distributing workflow 324 is shown exemplary for component 302. But for a fully distributed composite application, every component can be distributed. The undistributed component 302a contains the distribution descriptor 302b. The distributing workflow 324 evaluates the distribution descriptor 302b. With respect to the requirements 302c and the configuration 322 the distribution script 302d is created. The distribution workflow 324 executes the distribution script 302d, which triggers the distribution of the component 302e. The process is repeated for every component until the distribution of the composite application 320 is completed.

In the following sections, the process shown in FIGS. 3a and 3b is explained in accordance with a non-limiting, exemplary embodiment of the present invention.

A user wants to set up a shopping website for a private online shop. The shopping website is supposed to be executed by a webserver, which implements a 32-bit version of a Java runtime environment 8, which is connected to a network for receiving the composite application 320. The user consults an app-store, the code asset repository, and searches for the composite application 320, which provides online shopping services. Furthermore, the composite application 320 must be able to be executed by the runtime environment the user has installed on the user's server. The user selects the composite application 320 comprising a catalogue for goods the user wants to sell, a communication portal for communication with customers, a section for leaving a review of the goods, a shopping cart for closing a deal and the feature for paying with online banking or credit card. The composite application 320 includes components, where each component may have sub-components. The catalogue, for example, may have a subcomponent for not showing just the catalogue as a whole but for showing one entry with more detail.

Upon the selection of the composite application 320, the user receives the selected components and an executable file for distribution of the shopping website. The executable file may start execution automatically. The executable file comprises the distributing workflow. During the execution of the distributing workflow, the distribution descriptor of each component and, if existing, each subcomponent, is evaluated. Then, for each component a distribution script is created, which is adapted to distribute the components to a Java runtime environment 8 operated by a 32-bit operating system, as specified in the configuration.

The distributing workflow then executes the distribution scripts, which trigger the distribution of each component one after another. During the process the components of the shopping website are published and deployed to the server. After the execution of the distributing workflow, the shopping website is ready to be filled with goods and offers, the payment options may be filled and the shopping website is ready to use.

Figure 4:
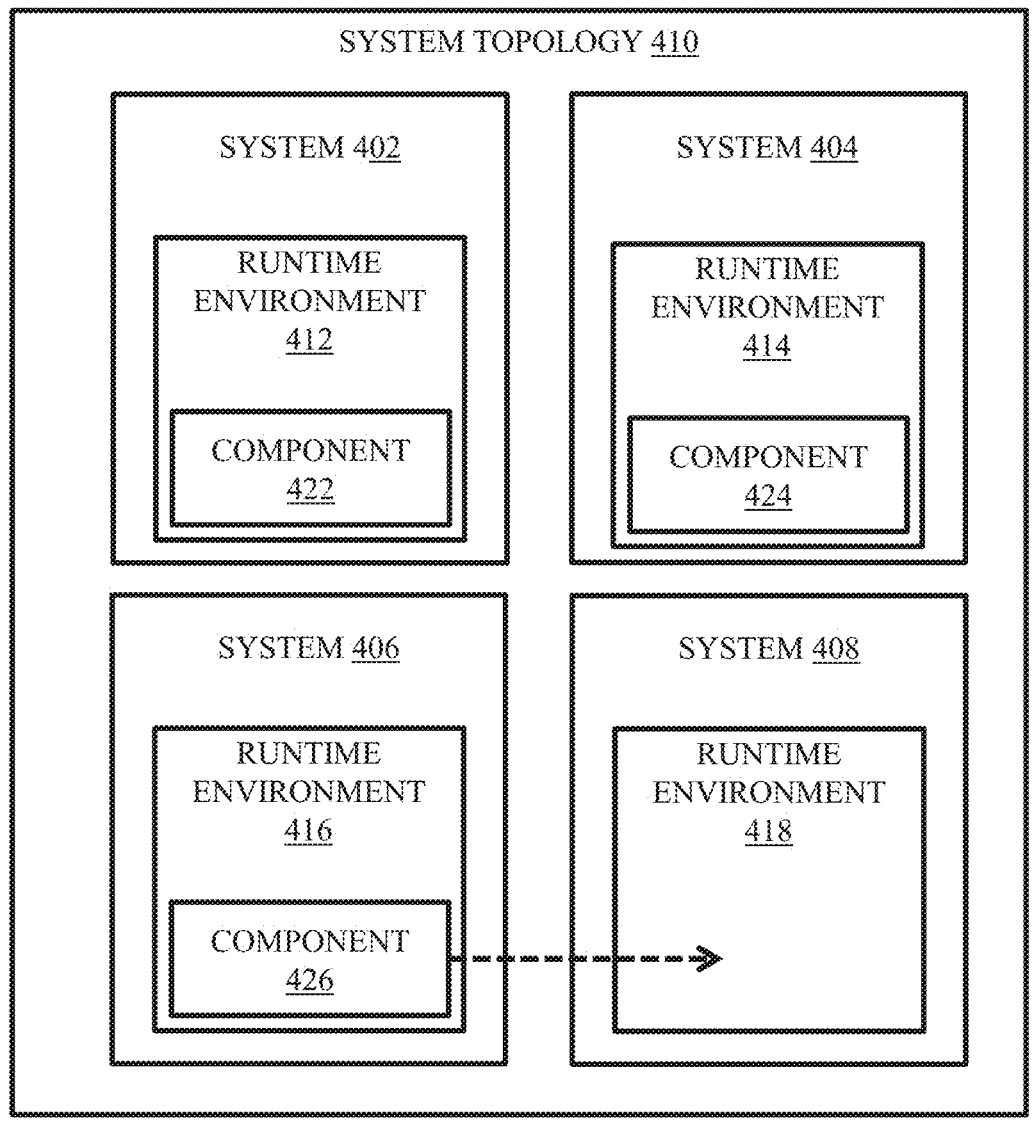
FIG. 4 depicts a migration of an execution of a component, in accordance with embodiments of the present invention.

FIG. 4 depicts a migration of an execution of a component, in accordance with embodiments of the present invention. A composite application comprising components 422, 424, 426 was distributed over the system topology 410. The system topology may comprise systems 402, 404, 406, 408. System 402 comprises a runtime environment 412, system 404 comprises a runtime environment 414, system 406 comprises a runtime environment 416 and system 408 comprises a runtime environment 418. Component 426 is distributed on system 406 and system 408. FIG. 4 depicts the moment of migration of the execution of component 426. If the execution of the component 426 is halted for any reason, a state of the component 426 may be transferred to runtime environment 418 on system 408, which continues the execution at the point runtime environment 416 has stopped working.

Figure 5A:
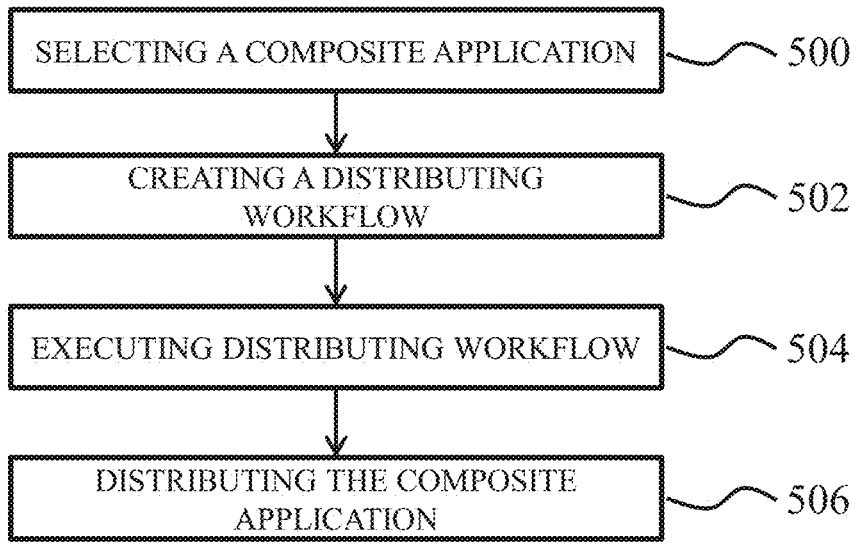
FIG. 5a depicts a flow chart showing the distributing of the composite application, in accordance with embodiments of the present invention.

FIG. 5a depicts a flow chart showing the distributing of the composite application, in accordance with embodiments of the present invention. At first, a composite application is selected at step 500 from a code asset repository. The code asset repository may be provided as an app-store, as a library for programming code or in any form of representation for depicting a list of composite applications to choose from. Upon the selection of the composite application, a distribution unit automatically creates a distribution workflow at step 502. The distributing workflow comprises a configuration, which specifies a runtime environment, which will execute the components of the composite application. After the creation of the distributing workflow, the distributing workflow is executed 504 automatically. The execution of the distributing workflow results in the distribution of the chosen composite application 506.

Figure 5B:
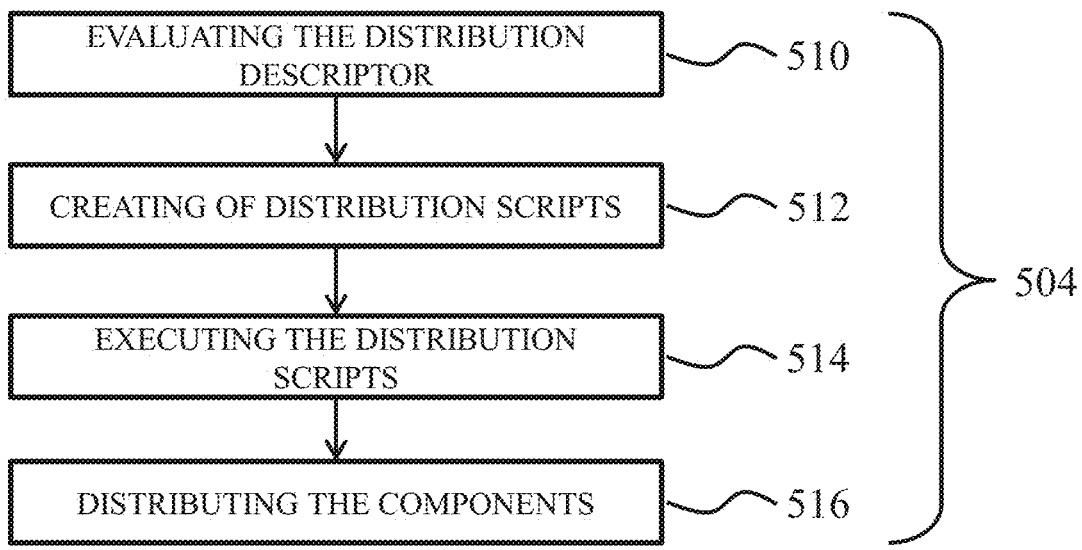
FIG. 5b depicts a flow chart showing the execution of the distributing workflow in more detail, in accordance with embodiments of the present invention.

FIG. 5b depicts a flow chart showing the execution of the distributing workflow 504 in more detail, in accordance with embodiments of the present invention. At first the distribution descriptor of each component is evaluated at step 510 according to the configuration of the distributing workflow. The distribution descriptors are specifying the requirements for the runtime environment of the components, while the configuration specifies the runtime environment. When the distribution descriptors are evaluated, distribution scripts are created for each component at step 512. The creation of the distribution scripts comprises assembling distribution instructions for the components from a distribution script repository, which is a library comprising the distribution instructions for each of the components. After assembling the distribution instructions, the instructions are adapted according to the configuration.

The adaptation for the configuration is performed, because the composite application is supposed to be executed by a system which is unspecified prior to the selection of the composite application. The components being developed for multiple systems and the corresponding distribution instructions are gathered in the deployment script repository. The workflow is able to assemble the correct distribution instructions because of the evaluating of the distribution descriptors prior to the creating of the distribution scripts. When the distribution instructions are adapted, the distribution scripts are executed at step 514. The execution of the distribution scripts then triggers the distribution of the components at step 516. When all components are distributed, the composite application is distributed and the process of FIG. 5a ends.

The present invention may be a system a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing, device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad Network Access:

capabilities are available over a network and accessed through standard mechanisms that promote use by heterogeneous thin or thick client platforms (e.g., mobile phones, laptops, and PDAs).

Resource Pooling:

the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter)

Rapid Elasticity:

capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured Service:

cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
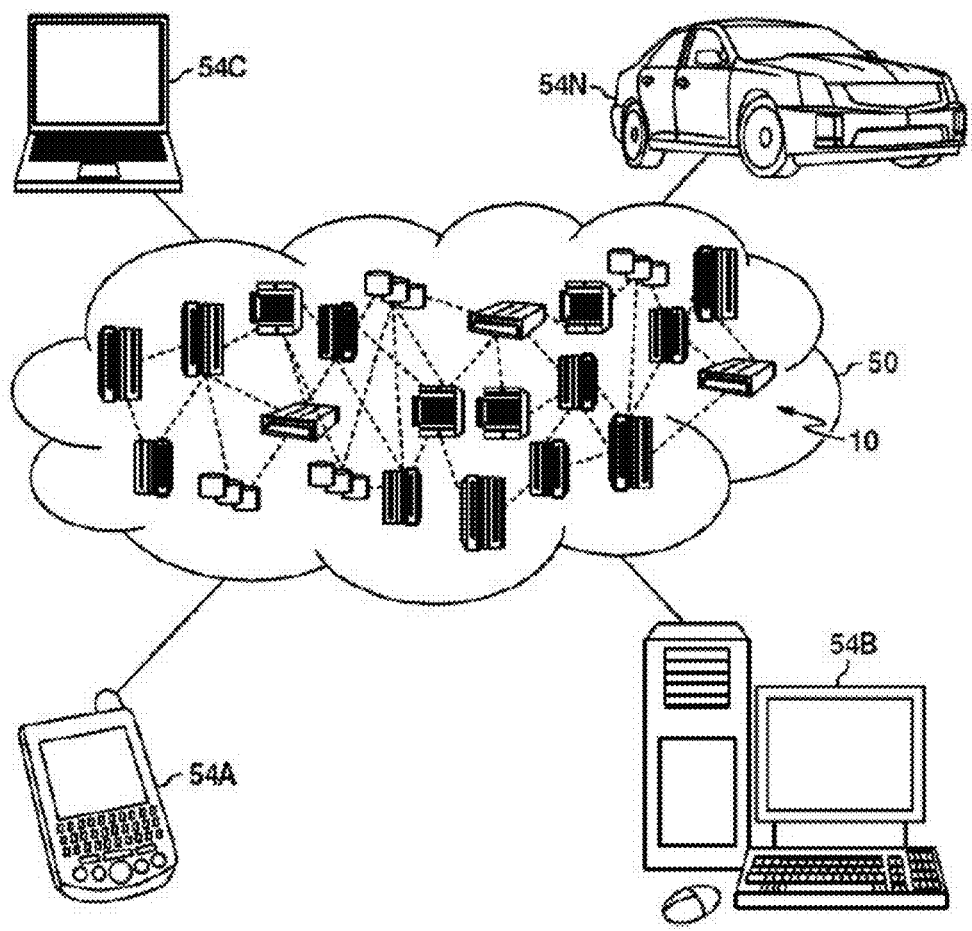
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
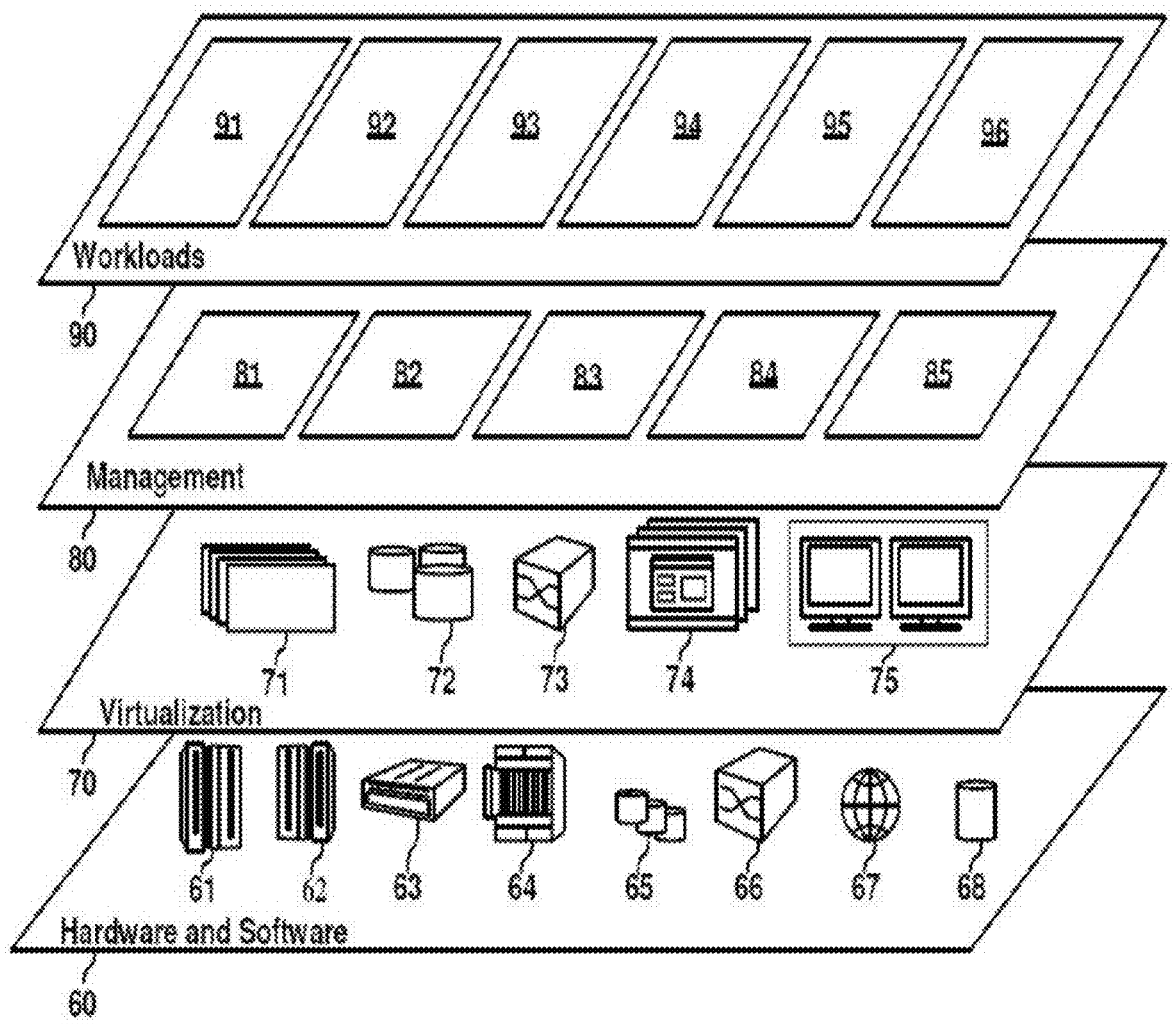
FIG. 7 depicts abstraction model layers, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and composite application distribution 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for distributing a composite application, the composite application being adapted to be distributed on multiple systems implementing runtime environments, the runtime environments comprising at least one target runtime environment, the method comprising:
    selecting, by a processor of a computing system, the composite application from a code asset repository, the composite application comprising a plurality of components that each have associated distribution descriptors that specify requirements for the at least one target runtime environment;
    upon the selection of the composite application, creating, by the processor, a distributing workflow by a distributing unit, the distributing workflow comprising a configuration, the configuration specifying the at least one target runtime environment and capabilities of the at least one target runtime environment; and
    executing, by the processor, the distributing workflow that results in a distribution of the composite application.

2. The method of claim 1, wherein the distribution descriptor further specifies an application programming interface of the associated component, the application programming interface specifying a communication capability of the component with another one of the components.

3. The method of claim 1, wherein the distribution descriptor further specifies an application programming interface of the associated component, the application programming interface further specifying a communication capability of the component with a system the at least one target runtime environment is implemented on.

4. The method of claim 1, wherein the distribution descriptor further specifies an application programming interface of the associated component, the application programming interface further specifying a communication capability of the component with a user using the composite application.

5. The method of claim 1, wherein the plurality of components are distributed over at least two systems of the multiple systems, the systems being comprised in a system topology.

6. The method of claim 1, wherein each runtime environment executes one of the components.

7. The method of claim 1, further comprising:
    upon deploying the plurality of components, testing, by the processor, the composite application, the testing generating a testing result;
    creating, by the processor, a second distributing workflow by the distributing unit, the second distributing workflow comprising the configuration; modified according to the testing result; and
    executing, by the processor, the second distributing workflow.

8. The method of claim 7, wherein the testing comprises generating, by the processor, artificial input for each component, processing, by the processor, the artificial input by the plurality of components, and comparing, by the processor, an output from each component with a nominal value, the comparing generating the testing result.

9. The method of claim 1, wherein the plurality of components are based on different coding languages.

10. The method of claim 1, wherein the coding languages are selected from the group consisting of: Java, Java Script, Node.js, Scala, Haskell, C++, C, C#, Ruby, Python, Pascal, Visual Basic, and UNITY.

11. The method of claim 1, wherein the distribution of the plurality of components comprises a publishing of one of the plurality of components in case the one of the plurality of components comprises a front-end object.

12. The method of claim 1, wherein the distribution of the plurality of components comprising a deploying of one of the plurality of components in case the one of the plurality of components comprises a back-end object.

13. The method of claim 1, wherein the composite application is selected by a user.

14. The method of claim 1, wherein the executing comprises:
    evaluating the distribution descriptor of each component according to the configuration, based on the evaluating, creating a distribution script for each component, and executing the distribution script, resulting in a triggering of a distribution of the plurality of components on at least one of the multiple systems implementing e at least one target runtime environment.

15. The method of claim 14, wherein the distribution scripts comprise distribution instructions for the components, the distribution instructions being assembled from a distribution script repository and adapted for the configuration.

16. A computer system for distributing a composite application, the composite application being adapted to be distributed on multiple systems implementing runtime environments, the runtime environments comprising at least one target runtime environment, the system comprising:
    a processor;
    a memory device coupled to the processor; and
    a computer readable storage device coupled to the processor, wherein the storage device contains program code executable by the processor via the memory device to implement a method for distributing the composite application, the method comprising:
        selecting, by a processor of a computing system, the composite application from a code asset repository, the composite application comprising a plurality of components that each have associated distribution descriptors that specify requirements for the at least one target runtime environment;
        upon the selection of the composite application, creating, by the processor, a distributing workflow by a distributing unit, the distributing workflow comprising a configuration, the configuration specifying the at least one target runtime environment and capabilities of the at least one target runtime environment; and
        executing, by the processor, the distributing workflow that results in a distribution of the composite application.

17. The computer system of claim 16, wherein, the executing comprising:
    evaluating the distribution descriptor of each component according to the configuration,
    based on the evaluating, creating a distribution script for each component, and
    executing the distribution script, resulting in a triggering of a distribution of the plurality of components on at least one of the multiple systems implementing the at least one target runtime environment.

18. A computer program product for distributing a composite application, the composite application being adapted to be distributed on multiple systems implementing runtime environments, the runtime environments comprising at least one target runtime environment, the computer program product comprising a computer readable hardware storage device storing a computer readable program code, the computer readable program code comprising an algorithm that when executed by a computer processor of a computing system implements a method for distributing the composite application, the method comprising:
    selecting, by a processor of a computing system, the composite application from a code asset repository, the composite application comprising a plurality of components that each have associated distribution descriptors that specify requirements for the at least one target runtime environment;
    upon the selection of the composite application, creating, by the processor, a distributing workflow by a distributing unit, the distributing workflow comprising a configuration, the configuration specifying the at least one target runtime environment and capabilities of the at least one target runtime environment; and
    executing, by the processor, the distributing workflow that results in a distribution of the composite application.

19. The computer program product of claim 18, wherein the executing comprising:
    evaluating the distribution descriptor of each component according to the configuration,
    based on the evaluating, creating a distribution script for each component, and
    executing the distribution script, resulting in a triggering of a distribution of the plurality of components on at least one of the multiple systems implementing the at least one target runtime environment.

* * * * *